(12) United States Patent
Cessac

(10) Patent No.: US 6,431,458 B1
(45) Date of Patent: Aug. 13, 2002

(54) TEMPERATURE ACTUATED FLOW RESTRICTOR

(75) Inventor: Kevin Cessac, Houston, TX (US)

(73) Assignee: PGI International, Ltd., Houston, TX (US)

( * ) Notice: Subject to any disclaimer, the term of this patent is extended or adjusted under 35 U.S.C. 154(b) by 0 days.

(21) Appl. No.: 09/886,849

(22) Filed: Jun. 21, 2001

Related U.S. Application Data

(63) Continuation-in-part of application No. 09/832,421, filed on Apr. 10, 2001.

(51) Int. Cl.[7] .............................................. G05D 23/10
(52) U.S. Cl. .................................. 236/48 R; 236/101 E
(58) Field of Search ............................. 236/48 R, 93 R, 236/101 E

(56) References Cited

U.S. PATENT DOCUMENTS

| | | | |
|---|---|---|---|
| 3,662,737 A | * | 5/1972 | Richards .................... 126/92 R |
| 3,856,259 A | | 12/1974 | Doherty, Jr. |
| 3,930,613 A | | 1/1976 | Place |
| 4,026,464 A | * | 5/1977 | Doherty, Jr. ............. 137/625.5 |
| 4,076,172 A | | 2/1978 | Inada et al. |
| 4,133,478 A | | 1/1979 | Place |
| 4,142,676 A | | 3/1979 | Hattori |
| 4,142,677 A | * | 3/1979 | Ludwig ...................... 137/468 |
| 4,295,602 A | | 10/1981 | Priesmeyer |
| 4,557,419 A | | 12/1985 | Hall, II |
| 5,011,075 A | * | 4/1991 | Vandiver ..................... 138/45 |

* cited by examiner

*Primary Examiner*—William E. Tapolcai
(74) *Attorney, Agent, or Firm*—Browning Bushman P.C.

(57) ABSTRACT

A thermostat valve 10 is provided for controlling gas flow to an infrared catalytic heater 26. The thermostat valve includes a thermally responsive snap member 50, 64, 150 positioned within a housing central flow path and moveable with respect to the housing between open and closed positions. An elastomeric seal 54 supported on the housing surrounds the central flow path and engages the snap member when in the closed position. A restricted flow path 58, 68, is provided in one of the housing and the snap disk for passing gas to the catalytic heater when the snap member is closed. The thermostat valve is relatively simple yet highly reliable.

19 Claims, 5 Drawing Sheets

TEMPERATURE ACTUATED FLOW RESTRICTOR

This application is a continuation-in-part of Ser. No. 09/832,421 filed Apr. 10, 2001.

FIELD OF THE INVENTION

The present invention relates to a temperature actuated flow restrictor, also called a thermostat valve, for controlling gas flow to a heater. More particularly, this invention relates to an improved thermostat valve for controlling the flow of natural gas or propane for powering an infrared catalytic heater.

BACKGROUND OF THE INVENTION

Catalytic heaters employ a catalyst bed that results in flameless combustion of the fuel and the creation of infrared energy. Since combustion is flameless, these heaters may operate at a temperature that is lower than the ignition temperature of the natural gas or propane. Catalytic heaters are thus particularly well suited for applications desiring explosion proof operation, such as various applications involving the natural gas industry. In a typical catalytic heater, a catalyst bed is heated to a temperature of about 250° F. at which time the thermostat valve is opened so that the supplied fuel and oxygen form the desired reaction with the catalyst bed.

When a desired temperature in a room or area about the heater is achieved, to maintain the temperature, the amount of gas supplied to the heater must be reduced. It is important, however, that the supply of gas flow not be completely shut-off since removing the fuel supply would allow the catalyst to cool below the reaction temperature, which would then again require the catalyst bed to be raised to above 250° F. to restart the reaction. Conventional thermostat valves for most natural gas or propane consuming devices are designed to close off the fuel supply at a set point temperature. When such valves are used with catalytic heaters, manufacturers have modified the valves to add an orifice through the valve body to allow a reduced gas flow to pass through the thermostat valve when closed, thereby reducing the heater output while preventing total fuel-shutoff. Conventional thermostat valves are quite large and thus expensive, since these thermostat valves are generally designed for use with equipment which uses a much higher flow rate of natural gas or propane than do catalytic heaters. Conventional thermostat valves are also complex, and frequently require high maintenance and repair costs.

Various types of valves have been designed which utilize a thermally responsive disk as the valve restriction member. The thermally responsive disk is typically a bi-metal disk having two metallic layers bonded together with one of the layers having a higher thermal coefficient of expansion than the other. U.S. Pat. Nos. 3,856,259, 3,930,613, 4,076,172, and 4,142,676 disclose prior art valves with bi-metal disks. In general, these valves are also complex and utilize various schemes for enabling the snap disk to close off flow through the valve. U.S. Pat. No. 4,133,478 discloses a snap disk with a spider-type spring and an O-ring valve seat. U.S. Pat. No. 4,295,602 discloses a valve intended for use to limit the temperature of hot water in a shower system, and restricts the water flow when the snap disk is in the closed position. Since no elastomeric seal is provided for engagement with the snap disk, the flow rate of the restricted water may vary. U.S. Pat. No. 4,557,019 discloses a flow control device intended for use with a gas analyzer and a heated sampling system to prevent liquid condensation in the system. None of the above prior art patents disclose a valve which is intended to control the flow of natural gas or propane to an infrared catalytic heater.

The disadvantages of the prior art are overcome by the present invention, and an improved thermostat valve for controlling gas flow to a catalytic heater is hereinafter disclosed.

SUMMARY OF THE INVENTION

A thermostat valve according to the present invention is particularly designed for controlling the flow of gas, such as natural gas or propane, to fuel an infrared catalytic heater. In one embodiment, the valve includes a housing having a central flow path between the inlet port and the outlet port, and a snap disk movable with respect to the housing between opened and closed positions. An elastomeric seal supported on the housing is intended for engagement with the snap disk when in the closed position. A restricted flow path spaced radially outward from the elastomeric seal allows a restricted quantity of gas to pass to the heater when the snap disk is closed. The snap disk may include a plurality of through ports for passing gas through the central flow path when open and through the restricted flow path in the housing when closed. An O-ring may be used as a biasing member for engaging a periphery of the snap disk to bias the snap disk for engagement with the elastomeric seal. When the heater raises the temperature to a desired level, the snap disk will move to the closed position to seal off flow through the central flow path in the valve. A reduced amount of gas continues to flow through the restricted flow path to prevent the heater from cooling below the catalyst reaction temperature. When the temperature drops below a selected value, the snap disk will move to the open position to allow flow through the central flow path in the housing, thereby providing an increased fuel flow rate to the heater to raise the surrounding temperature. In another embodiment, the snap member is provided with the restricted flow path for passing a limited quantity of gas to the heater when the snap member is closed.

In event the temperature in the room or environment in which the thermostat valve is located rises above an upper threshold level, fuel supplied to the catalyst bed may be completely shut off. A second or high temperature snap disk may be provided in the housing that is moveable with respect to the housing between an opened position and a closed position to close and completely shut off the flow of fuel to the catalyst bed. Thereby, the catalyst bed may not overheat the environment in which the bed is positioned. Another elastomeric seal supported on the housing is intended for engagement with the high temperature snap disk when in the closed position. The high temperature snap disk may include a plurality of through ports positioned radially outward of the elastomeric seal element for passing gas through the central flow path when the high temperature disk is in the opened position. An O-ring may be used as a biasing member for engaging a periphery of the snap disk to bias the snap disk for engagement with the elastomeric seal. When the heater raises the temperature to a selected level, the snap disk will move to the closed position to seal off flow through the central flow path in the valve.

It is an object of the present invention to provide a relatively low cost yet highly reliable thermostat valve for controlling gas flow to an infrared catalytic heater. A related object of the invention is to provide a thermostat valve which is simple and has few, and preferably only one or two moving parts.

It is another object of the present invention to provide a thermostat valve that can reliably control the fuel flow to a catalyst bed and operate the bed between selected lower and upper temperature ranges.

It is a feature of the invention that the thermostat valve may be manufactured to operate at various temperatures by changing the bi-metal disk.

It is another feature of the invention that the safety of the thermostat valve is enhanced by providing a valve which does not require any user adjustments.

It is a significant advantage of the invention that the thermostat valve is simple, highly reliable, and has a relatively low manufacturing and maintenance cost.

An additional advantage is that the thermostat valve can provide a high temperature fuel shut-off to shut down the catalyst bed in the event a selected high temperature threshold is exceeded.

These and other objects, features, and advantages of the present invention will become apparent from the following detailed description, wherein reference is made to the figures in the accompanying drawings.

BRIEF DESCRIPTION OF PREFERRED EMBODIMENTS

Figure 1:
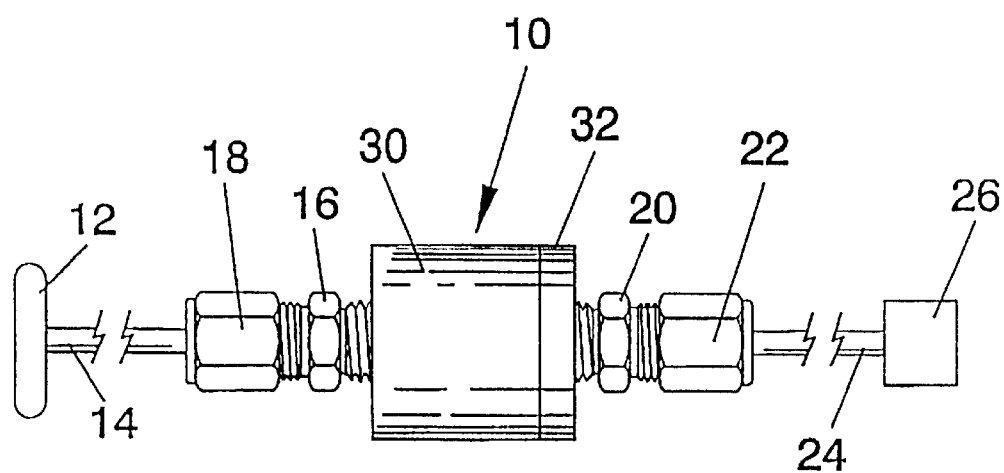
FIG. 1 is a simplified representation of a thermostat valve according to the present invention positioned along a flow path from a gas storage vessel to a catalytic heater.

The temperature actuated flow restrictor or thermostat valve according to the present invention is particularly well suited for controlling the flow of natural gas or propane for powering an infrared catalytic heater. FIG. 1 simplistically depicts a storage vessel 12 with a flow line 14 in fluid communication with conventional fitting 16 which is threaded to thermostat valve 10. A conventional tubing connector 18 is provided for forming a fluid-tight seal between tubing line 14 and threaded fitting 16. A similar fitting 20 is threaded to the outlet port of the thermostat valve 10, with connector 22 fluidly connecting the outlet flow line 24 to the threaded fitting 20. An infrared catalytic heater 26 is thus provided with fuel through the line 24, with the flow of fuel being regulated by the thermostat valve 10.

Figure 2:
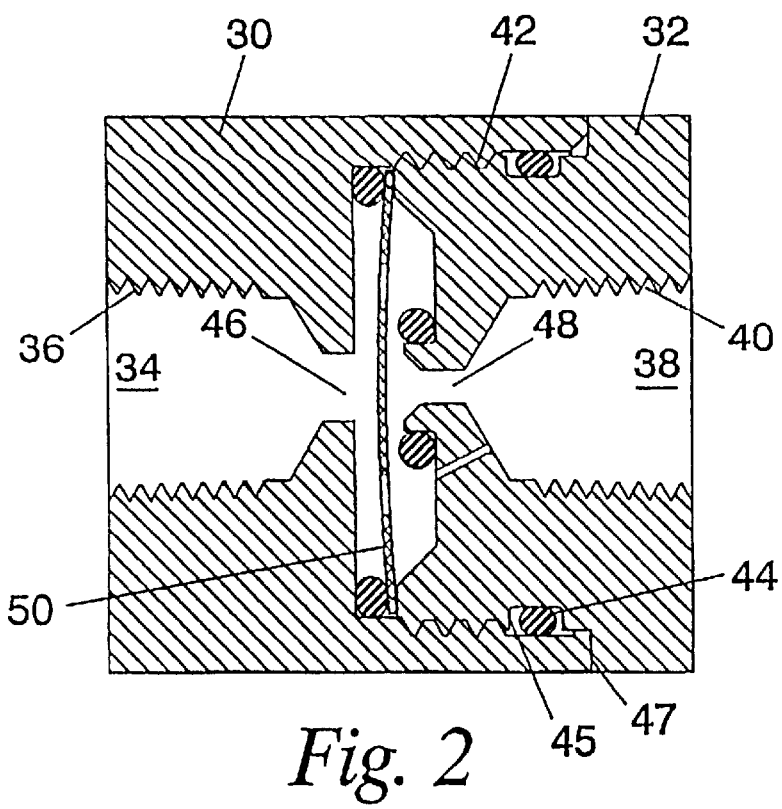
FIG. 2 is cross-sectional view of the thermostat valve as shown in FIG. 1 in the open position.

FIG. 2 depicts the thermostat valve 10 in the open position. Inlet housing 30 includes an inlet port 34 with threads 36 for receiving fitting 16. The outlet housing 32 includes outlet port 38 having similar threads 40 for engagement with fitting 20. The inlet and outlet ports are interconnected by mating housing threads 42. An O-ring seal 44 is provided in groove 45 within the outlet housing, and forms a fluid-tight static seal between the housing 30 and the housing 32.

Figure 3:
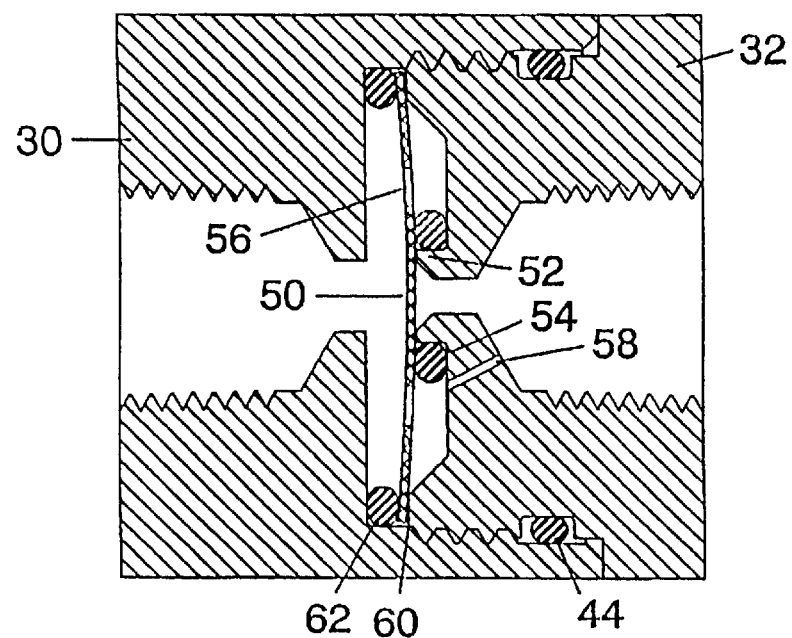
FIG. 3 is cross-sectional view of the valve as shown in FIG. 1 in the closed position.

The housing includes a central flow path extending between the ports 34 and 38, with the snap disk 50 positioned within the central flow path and moveable with respect to the housing, as shown in FIGS. 2 and 3, from the open position to the closed position. More particularly, the inlet housing includes central through port 46, and the outer housing includes a central through port 48. Gas thus flows through the one or more ports 56 provided in the snap disk 50 and through the port 48 when the snap disk is in the open position.

An elastomeric seal 54 is supported on the outlet housing 32, and more specifically is restrained from radial movement by the annular lip 52. A biasing member, such as an elastomeric material ring 62, engages the periphery of the snap ring 50 and acts to exert a slight force which biases the snap ring to the closed position. Biasing member 62 also accommodates or "takes up" tolerance variations between the housings when fully mated by engagement of mating surfaces 47. Snap disk 50 is effectively sandwiched between the stop surface 60 on the outlet housing 32 and the elastomeric ring 62, so that the slight pressure provided by the elastomeric ring 62 exerts a right convex force on the snap ring 50.

Once the temperature of the snap ring 50 drops below a selected value, which would be greater than the reaction temperature of the catalyst in the heater 26, the snap ring will automatically move to the left convex shape, as shown in FIG. 2, thereby unsealing the snap ring from the elastomeric seal 54. Natural gas or propane may thus pass through the ports 56 in the snap ring and through the port 48, thereby supplying an increased flow rate of gas to the heater to heat the surrounding environment. When fully open, the thermostat valve is capable of passing much more gas than the flow rate used by the heater, but flow through the valve is limited by a downstream flow restrictor within or associated with the heater. Once heated to a desired temperature, snap ring 50 will snap to the closed position as shown in FIG. 3, thereby forming a fluid-tight seal with the O-ring 54. This tight seal is important since the valve, when closed, only passes gas through the restricted flow path discussed below. It is thus important that this restricted gas flow rate be substantially constant.

Each of the one or more through passageways in the snap disk is positioned radially outward of the elastomeric seal 54, so that no flow through the port 48 occurs when the snap ring is in the closed position. A small amount of fluid flow continues to pass through the ports 56 in the snap disk, however, then flows through the restricted flow path 58 in the outlet housing 32, thereby supplying sufficient gas to the heater to prevent the catalyst from cooling below minimum reaction temperature. In order to insure that the central flow path is closed off when the snap ring is in the FIG. 3 position, each of the one or more through passageways 56 in the snap ring and the restrictive flow path 56 in the housing are radially outward from the elastomeric seal 54. Particularly with respect to the restricted flow passageway 58, this "radially outward" positioning means that at least part of the restricted flow path is radially outward from the seal 54 so that the restricted flow bypass past the seal 54 is provided when the snap ring is in the closed position. At least a portion of the passageway 58 is thus radially outward from the seal 58, with this restricted flow passageway being in parallel with the central flow path through the elastomeric seal. The snap disk 50, when closed, may also rest against a stop surface on the housing adjacent the O-ring 54, as shown in FIG. 3. In a preferred embodiment, the restricted flow path 58 has a substantially uniform cross-section the diameter less than 0.04 inches. In a preferred embodiment, the restricted flow path may have a uniform diameter of from 0.015 to 0.025 inches.

Although FIGS. 2 and 3 show the elastomeric seal 54 provided on the outlet housing and the restricted flow path 58 in the outlet housing, the seal 54 could be supported on the inlet housing, in which case the restricted flow path could also be provided in the inlet housing.

Figure 4:
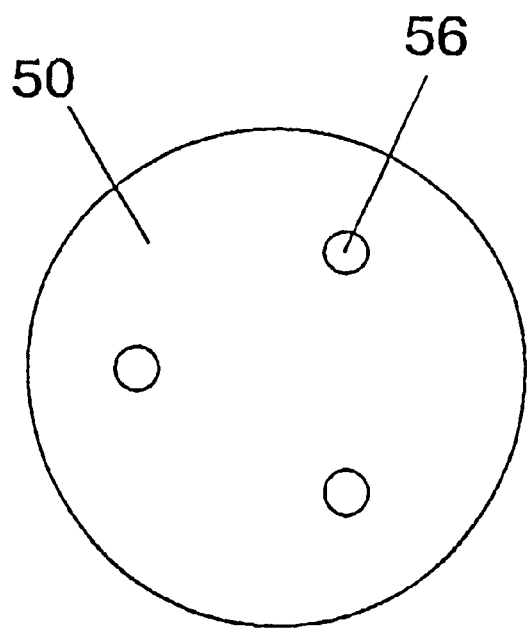
FIG. 4 is a top view of the bi-metal disk shown in FIGS. 2 and 3.

FIG. 4 illustrates the top view of the disk valve 50, and shows three circumferentially spaced ports 56. It should be understood that the passageways 56 in the snap disk may have other configurations and, if desired, may extend to an edge surface of the snap disk.

Figure 5:
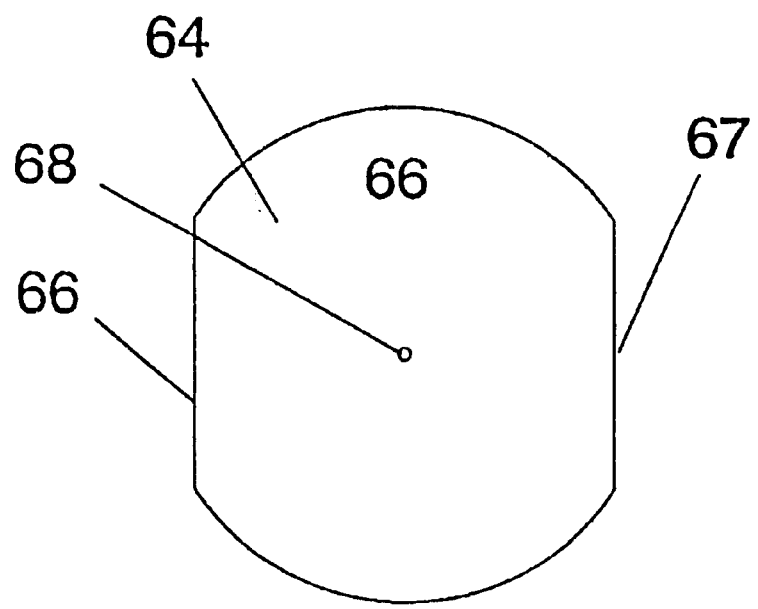
FIG. 5 is a top view of an alternative bi-metal member.

In another embodiment, the thermally responsive snap member may not be disk shaped, but rather could have a more rectangular configuration, as shown in FIG. 5, provided that the width of the snap member is greater than the diameter of the O-ring 54, so that flow is reliably closed off through the port 48 when the snap member is in the closed position. The snap member 64 thus has parallel side edges 66, 67. For this embodiment, the passageways past the snap member may thus be formed by the spacing between the sides of the snap member and the interior wall of the housing. The elastomeric material ring 62 may still be provided, however, for exerting a desired biasing force on the snap member.

FIG. 5 also shows another technique for forming the restricted flow path. In this case, the snap member 64 is provided with a centrally positioned small through port 68 through the snap member, which may be formed by a laser cutting operation. For this embodiment, the restricted flow path 58 in the housing may thus be eliminated since the snap member, when closed and in sealing engagement with the O-ring 54, still allows a restricted amount of gas to pass through the disk and then through port 48 to supply a restricted amount of gas to the heater to prevent the heater from cooling below a desired temperature. As previously discussed, the port 68 may have a nominal diameter of about 0.02 inches, and like passageway 58, is shown enlarged for clarity.

Figure 6:
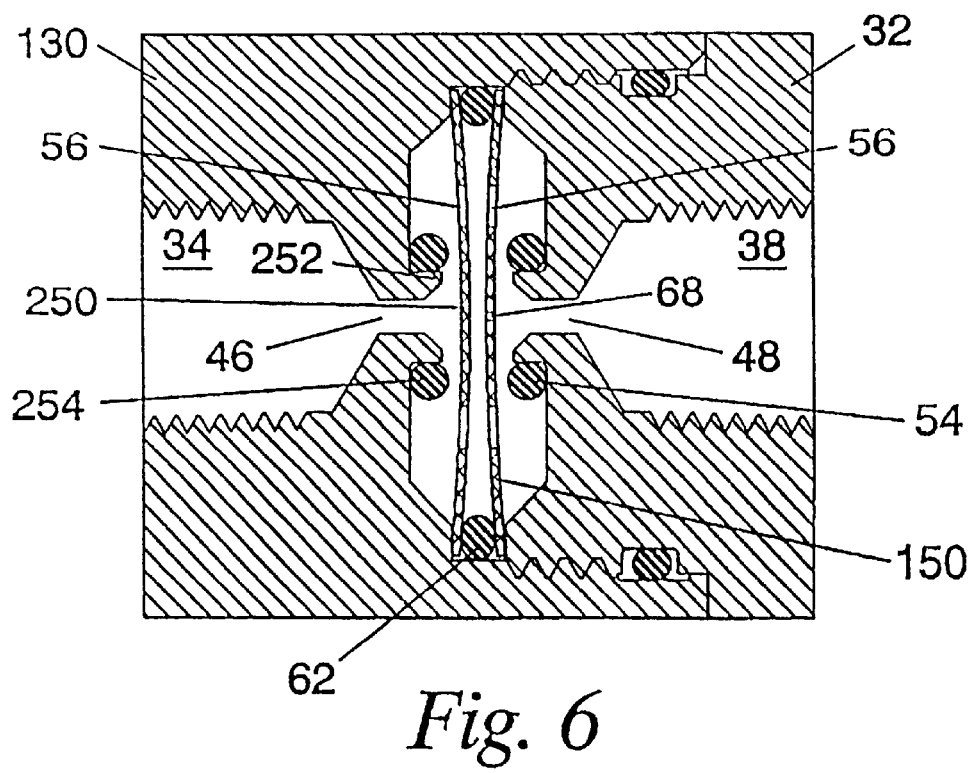
FIG. 6 is a cross-sectional illustration of another embodiment of a thermostat valve providing two bimetal snap members, with both members in an opened position.

FIG. 6 illustrates another embodiment of a thermostat valve including two snap members which may be used for conducting fuel to a catalytic bed. The first low temperature snap member may be configured such as snap member 50 illustrated in FIG. 1, in which case a restricted flow passageway 58 may be positioned in the housing member 32. The first snap member also may be configured such as snap member 66 illustrated in FIG. 5, providing the restricted flow passageway 68 within the snap member 66 and flow passageways exterior of the snap member. In a preferred embodiment, the snap member 150 includes the restricted passageway 68 and the one or more large diameter ports 56 radially outward of the O-ring 54.

Figure 8:
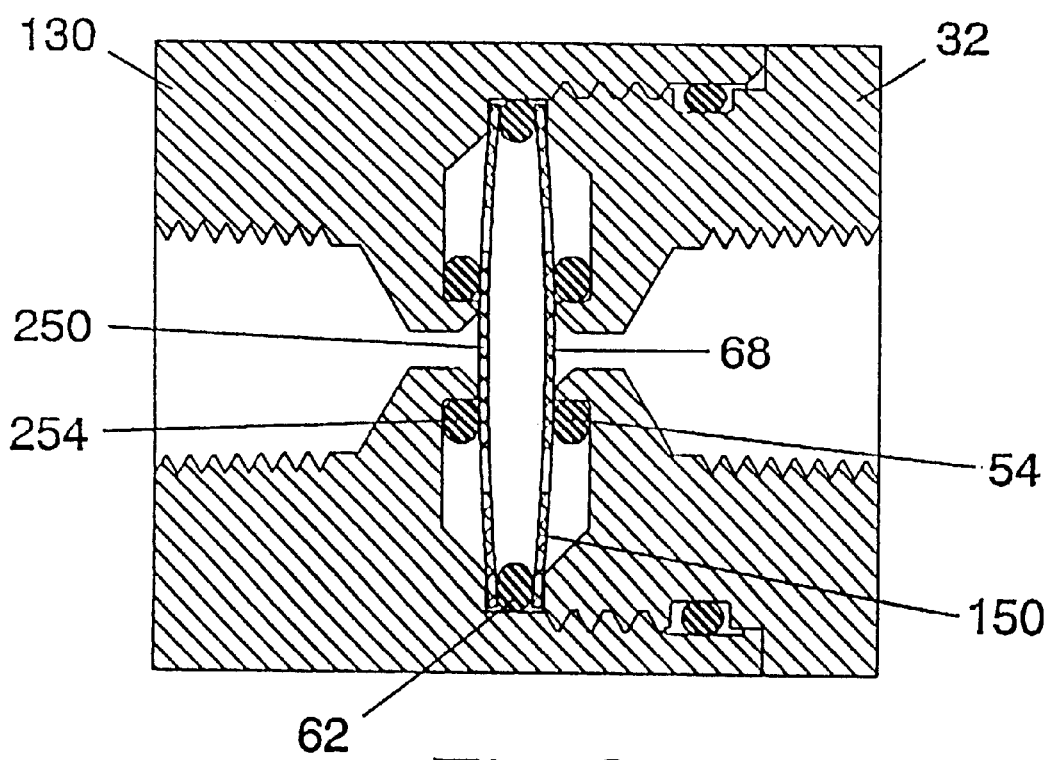
FIG. 8 is a cross-sectional illustration of the valve illustrated in FIG. 6, with both snap members in the closed position.

The valve embodiment illustrated in FIG. 6 also provides a second high temperature snap member 250 positioned within the housing 30, spaced axially apart from the first snap member 150. The second snap member 250 may be operable between an opened position, as illustrated in FIG. 6, and a closed position, as illustrated in FIG. 8. The snap member 250 also includes radially-outward positioned ports 56 for conducting fuel gas therethrough when in the opened position, but no restricted passageway 68 in the snap member 250 or port 58 in the valve body is positioned for cooperation with snap member 250.

The housing for the embodiment illustrated in FIG. 6 includes a housing member 130 supporting an elastomeric seal 254, which is restrained from radial movement by annular lip 252. Biasing member 62, such as an O-ring, may serve to space the snap members 150, 250 apart from each other, and seal between both the snap members, and between the housing and each snap member. Biasing member 62 engages the periphery of each snap disk 150, 250 and may exert a slight force, which biases the snap member to the closed position. Biasing member 62 also accommodates or "takes up" tolerance variations between the housings 32 and 130 when fully mated. Both snap members 150, 250 are effectively sandwiched so that the slight pressure provided by the elastomeric ring 62 exerts a right convex force on the snap member 150 and a left convex force on the snap member 250.

Figure 7:
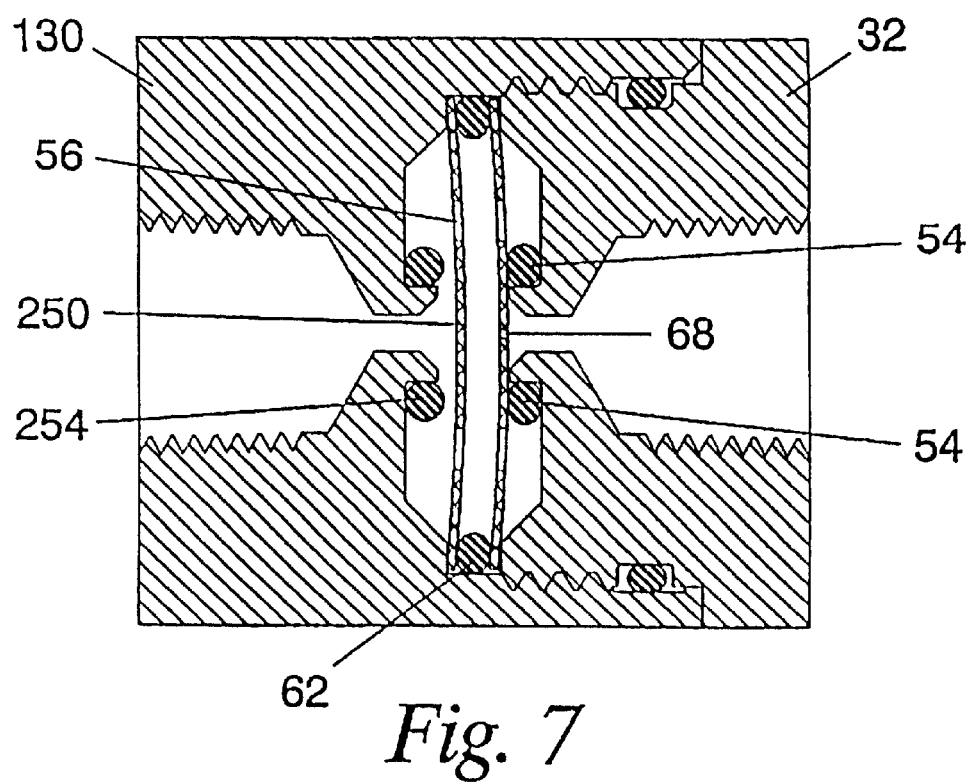
FIG. 7 is a cross-sectional illustration of the valve illustrated in FIG. 6, with the low temperature snap member in the closed position and the high temperature snap member is in the opened position.

Referring to FIG. 6, gas may enter the valve through port 34. Below a low temperature threshold, both disks 150 and 250 may be in the opened position. For example, below 140° F., the fuel gas may pass through ports 56 in each of disks 250 and 150, then through port 48 and to the heater or catalytic bed. When the heater is heated to a desired control temperature, e.g., 150° F., snap disk 150 will snap to the closed position, such as illustrated in FIG. 7, forming a fluid-tight seal with the O-ring 54. The tight seal of the disk 150 with the seal member 54 is important to precisely limit fuel flow through the restricted flow path 58 or 68 to the heater when the disk 150 is closed. This restricted flow path allows only enough gas to pass through the valve to maintain the bed above the minimum reaction temperature.

When the valve temperature falls below the low temperature point, such as below 140° F., the first snap disk 150 may snap open again to re-excite the heater and warm both the environment surrounding the heater and the thermostat valve. After the valve temperature elevates above 150° F., the first valve member 150 may again maintain sealed engagement with seal member 54, such as shown in FIG. 7.

Referring to FIG. 8, if valve temperature continues to increase to a high temperature shut-off point, e.g., above 200° F., the second snap member 250 may snap to the closed position and in sealed engagement with seal member 254. Thereby, fuel flow to the heater through the valve may be shut off completely, including flow through the restricted passageways 58 or 68. Valve temperature may rise above the high temperature shut-off point in the event the ambient temperature surrounding the valve is caused to rise above such point. The valve temperature may also be caused to rise above the high temperature shut-off point in the event the low temperature disk fails to operate properly.

If after being shut-off, the valve temperature subsequently drops below the high temperature shut-off point, snap member 250 may snap back to the opened position to permit fuel to again flow to the heater. In preferred installations or embodiments, other devices or components may maintain fuel shut-off to the heater such that the heater will require manual restarting. For example, a heater bed thermocouple may be provided in the fuel line, which prevents the subsequent flow of fuel once flow to bed is fully shut off. In alternative embodiments or installations, if after being shut-off, the valve temperature subsequently drops below the high temperature shut-off point, other components may control heater re-ignition.

Those skilled in the art will appreciate that fuel flow through the valve embodiments shown in FIGS. 1 through 8 may be in either direction along the central flow path. It may also be appreciated that snap disks may be configured to engage respective portions of the housing 30, 32, 130 which are adjacent the respective sealing O-ring when in the closed position. In still other embodiments, one of the snap members may support an elastomeric seal member thereon to engage the other snap member. Preferably, however, each snap member seal is supported on the housing for reliable sealing engagement with a respective snap disk when in the closed position.

In still other embodiments including two snap disks in the valve housing, each of the two snap disks may be provided with a restricting flow passageway of different sizes. Such configuration may allow for three different fuel flow rates, selectable based upon valve temperature. Maximum flow may be obtained with both snap disks in an opened position. When the first or lower temperature disk with a relatively larger orifice closes, the flow may be reduced to a medium flow rate. The higher temperature disk may include a relatively smaller orifice, which provides a low fuel flow rate when the higher temperature disk snaps closed. Thereby, in such two-disk configuration, no absolute fuel shut-off would be provided. If desired, a third disk without a restricted passageway may be provided in another housing in series along the fuel flow path to provide full shut off to the bed. In other embodiments, a thermostat valve embodiment such as illustrated in FIGS. 6 through 8 may be positioned in series flow with a valve which provides a relatively large restricted passageway therein. In still other embodiments, a valve body may be provided with three disks therein: a large orifice disk, a small orifice disk, and a shut-off disk.

The figures desirably show a straight-line central flow path through the housing. It should be understood that this configuration is preferred, although an angled central flow path through the housing could be provided so that the outlet port were positioned, for example, at 90 degrees relative to the inlet port. Those skilled in the art will appreciate that one or both of the inlet housing and outlet housing may include conventional wrench flats for exerting a desired torque on the inlet housing with respect to the outlet housing to insure a reliable sealed connection between the housings. If the restricted flow path in the valve body or in the snap member become plugged, the heater will cool below its operating temperature, so that the heater will safely shut down and the problem easily detected and corrected.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A thermostat valve for controlling gas flow, comprising:
    a housing having an inlet port, an outlet port, and a central flow path extending between the inlet port and the outlet port;
    a thermally responsive low temperature snap member positioned within the housing central flow path and moveable with respect to the housing between an open position and a closed position;
    a first elastomeric seal circumferentially surrounding the flow path through the housing for continuous engagement with the low temperature snap member when in the opened position and the closed position;
    a restricted flow path in one of the low temperature snap member and the housing for passing gas when the low temperature snap member is in the closed position;
    a thermally responsive high temperature snap member positioned within the housing central flow path and moveable with respect to the housing between an open and a closed position; and
    a second elastomeric seal circumferentially surrounding the flow path through the housing for closing off flow through the valve when the high temperature snap member is in the closed position.

2. A thermostat valve as defined in claim 1, further comprising:
    a third elastomeric seal engaging the low temperature snap member when in the closed position.

3. A thermostat valve as defined in claim 2, wherein the low temperature snap member and the high temperature snap member each include a flow path radially outward of the third elastomeric seal and the second elastomeric seal, respectively.

4. A thermostat valve as defined in claim 3, wherein the restricted flow path is provided in the low temperature snap member radially inward of the third elastomeric seal.

5. A thermostat valve as defined in claim 1, further comprising:
    the first elastomeric seal engaging a periphery of both the low temperature snap member and the high temperature snap member.

6. A thermostat valve as defined in claim 1, wherein each snap member has a disk shape.

7. A thermostat valve as defined in claim 1, wherein the housing includes an inlet housing and an outlet housing each having threads for mating engagement.

8. A thermostat valve as defined in claim 1, further comprising:
    the housing including a threaded inlet port and a threaded outlet port;
    a threaded inlet fitting for threaded engagement with the threaded inlet port; and
    a threaded outlet fitting for threaded engagement with the threaded outlet port.

9. A thermostat valve as defined in claim 1, wherein the restricted flow path has a substantially uniform cross-section with a diameter less than 0.04 inches.

10. A thermostat valve for controlling gas flow, comprising:
    a housing having an inlet port, an outlet port, and a central flow path extending between the inlet port and the outlet port;
    a bi-material low temperature snap member positioned within the housing central flow path and moveable with respect to the housing between an open position and a closed position;
    a first elastomeric seal supported on the housing and circumferentially surrounding the flow path through the housing for continuous engagement with the low temperature snap member when in the opened position and the closed position;
    a restricted flow path in the low temperature snap member radially inward of the first elastomeric seal for passing gas when the low temperature snap member is in the closed position;
    a bi-material high temperature snap member positioned within the housing central flow path and moveable with respect to the housing between an open position and a closed position;
    a second elastomeric seal supported on the housing and circumferentially surrounding the flow path through the housing for engagement with the high temperature snap member when in the closed position; and the high temperature snap member forming one or more passageways each positioned radially outward of the second elastomeric seal for passing gas when the high temperature snap member is in the open position.

11. A thermostat valve as defined in claim 10, further comprising:

a biasing member for biasing each of the low temperature snap member and the high temperature snap member toward the closed position.

12. A thermostat valve as defined in claim 11, wherein the biasing member comprises the first elastomeric seal engaging a periphery of both the low temperature snap member and the high temperature snap member.

13. A thermostat valve as defined in claim 10, wherein each snap member has a disk shape.

14. A thermostat valve as defined in claim 10, wherein the restricted flow path has a nominal diameter less than 0.04 inches.

15. A thermostat valve as defined in claim 10, wherein the low temperature snap member and the high temperature snap member each include a flow path radially outward of a third elastomeric seal and the second elastomeric seal, respectively.

16. A thermostat valve for controlling gas flow, comprising:

a housing having an inlet port, an outlet port, and a central flow path extending between the inlet port and the outlet port;

a thermally responsive low temperature snap disk positioned within the housing central flow path and moveable with respect to the housing between an open position and a closed position;

a first elastomeric seal supported on the housing and circumferentially surrounding the flow path through the housing for continuous engagement with the low temperature snap disk when in the opened position and the closed position;

a restricted flow path in one of the housing and the low temperature snap disk for passing gas when the low temperature snap disk is in the closed position;

a high temperature snap disk positioned within the housing central flow path and movable with respect to the housing between an open and a closed position;

a second elastomeric seal supported on the housing and circumferentially surrounding the flow path through the housing for engagement with the high temperature snap disk when in the closed position;

the high temperature snap disk forming one or more passageways each positioned outward of the second elastomeric seal for passing gas when the high temperature snap disk is in the open position;

a third elastomeric seal circumferentially surrounding the flow path through the housing for engagement with the low temperature snap disk when in the closed position; and the low temperature snap disk including one or more passageways each positioned radially outwardly of the third elastomeric seal for passing gas when the low temperature snap disk is in the open position.

17. A thermostat valve as defined in claim 16, further comprising:

the first elastomeric seal engages a periphery of both the low temperature snap disk and the high temperature snap disk.

18. A thermostat valve as defined in claim 14, wherein the restricted flow path is provided in the low temperature snap disk.

19. A thermostat valve as defined in claim 16, wherein the restricted flow path is in the low temperature snap disk and has a nominal diameter less than 0.04 inches.

* * * * *